United States Patent
Moreau et al.

(10) Patent No.: US 11,268,395 B2
(45) Date of Patent: Mar. 8, 2022

(54) TURBOMACHINE MODULE EQUIPPED WITH A HOLDING DEVICE FOR SEALING BLADES

(71) Applicant: SAFRAN AIRCRAFT ENGINES, Paris (FR)

(72) Inventors: Vincent Gérard Michel Moreau, Moissy-Cramayel (FR); Sabrina Benkaci, Moissy-Cramayel (FR); Emmanuel Wilfrid Léon Berche, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 16/869,980

(22) Filed: May 8, 2020

(65) Prior Publication Data

US 2020/0355087 A1 Nov. 12, 2020

(30) Foreign Application Priority Data

May 10, 2019 (FR) ...................................... 1904888

(51) Int. Cl.
*F01D 5/16* (2006.01)
*F01D 11/00* (2006.01)
(Continued)

(52) U.S. Cl.
CPC .............. *F01D 11/006* (2013.01); *F01D 5/16* (2013.01); *F01D 5/3038* (2013.01);
(Continued)

(58) Field of Classification Search
None
See application file for complete search history.

(56) References Cited

U.S. PATENT DOCUMENTS 5,118,120 A * 6/1992 Drerup ................... F16J 15/021
277/628
5,249,920 A * 10/1993 Shepherd .............. F01D 11/005
415/134
(Continued)

FOREIGN PATENT DOCUMENTS

EP 1 517 005 A1 3/2005
EP 1 918 549 A1 5/2008
(Continued)

OTHER PUBLICATIONS

Rapport De Recherche Preliminaire and Opinion dated Dec. 20, 2019, for French Application No. 1904888, filed May 10, 2019, 6 pages.

*Primary Examiner* — Michael Lebentritt
(74) *Attorney, Agent, or Firm* — Christensen O'Connor Johnson Kindness PLLC

(57) ABSTRACT

Turbomachine modules, for example for an aircraft, include a turbine nozzle having several sectors (S), each sector having guide vanes extending between inner and outer platform elements, at least one of the platform elements of each sector carrying, on the one hand, at least one sealing blade configured to ensure fluid sealing between the platform element and the adjacent structural element, and, on the other hand, a device configured to hold the at least one sealing blade in a sealing position. The device includes a leaf spring having a middle portion fixed to the platform element, and opposite end portions which are supported on the sealing blade carried by the platform element.

17 Claims, 3 Drawing Sheets

(51) Int. Cl.
    *F01D 5/30*   (2006.01)
    *F01D 11/12*  (2006.01)
    *F02C 7/28*   (2006.01)
    *F01D 5/14*   (2006.01)

(52) U.S. Cl.
    CPC ............. *F01D 11/127* (2013.01); *F02C 7/28* (2013.01); *F01D 5/145* (2013.01)

(56) References Cited

U.S. PATENT DOCUMENTS

| | | | |
|---|---|---|---|
| 6,464,232 B1 | 10/2002 | Marchi et al. | |
| 6,464,457 B1* | 10/2002 | Morgan | F01D 11/005 277/630 |
| 6,854,738 B2* | 2/2005 | Matsuda | F23R 3/60 277/632 |
| 7,025,563 B2* | 4/2006 | Servadio | F01D 9/042 415/137 |
| 7,040,098 B2* | 5/2006 | Lepretre | F01D 11/005 415/214.1 |
| 7,419,352 B2* | 9/2008 | Guentert | F01D 11/005 415/189 |
| 8,100,644 B2 | 1/2012 | Hazevis et al. | |
| 8,534,076 B2* | 9/2013 | Woodcock | F01D 9/023 60/800 |
| 9,115,585 B2* | 8/2015 | Melton | F01D 9/023 |
| 9,771,818 B2* | 9/2017 | Budnick | F01D 11/005 |
| 10,053,998 B2* | 8/2018 | Vo | F01D 25/28 |
| 10,240,474 B2* | 3/2019 | Feldmann | F01D 9/023 |
| 10,550,707 B2* | 2/2020 | Boeck | F01D 25/246 |
| 10,731,492 B2* | 8/2020 | Kloetzer | F16B 33/004 |
| 10,738,656 B2* | 8/2020 | Boeck | F01D 11/003 |
| 2003/0202876 A1* | 10/2003 | Jasklowski | F01D 11/025 415/135 |
| 2010/0071208 A1* | 3/2010 | Durocher | F01D 25/285 29/888.025 |
| 2012/0308368 A1* | 12/2012 | Helvaci | F01D 11/00 415/175 |
| 2016/0090853 A1* | 3/2016 | Lutjen | F01D 11/025 415/173.1 |
| 2018/0058223 A1* | 3/2018 | Lehmann | F01D 9/06 |
| 2018/0058262 A1* | 3/2018 | Schiessl | F01D 25/246 |
| 2018/0080334 A1* | 3/2018 | Boeke | F01D 5/06 |
| 2019/0024801 A1* | 1/2019 | Davis | F01D 11/005 |
| 2020/0003066 A1* | 1/2020 | Clark | F01D 11/08 |
| 2020/0003077 A1* | 1/2020 | Clark | F01D 25/28 |
| 2020/0024993 A1* | 1/2020 | Kumar | F01D 25/246 |
| 2020/0149477 A1* | 5/2020 | Barker | F02C 7/28 |
| 2020/0271003 A1* | 8/2020 | McCormick | F23R 3/60 |
| 2020/0340405 A1* | 10/2020 | Propheter-Hinckley | F01D 25/246 |
| 2020/0362715 A1* | 11/2020 | Propheter-Hinckley | F01D 11/005 |
| 2020/0386105 A1* | 12/2020 | McLaughlin | F01D 11/08 |

FOREIGN PATENT DOCUMENTS

| | | |
|---|---|---|
| EP | 2 060 743 A1 | 5/2009 |
| FR | 2 786 222 A1 | 5/2000 |
| FR | 2 887 588 A1 | 12/2006 |

\* cited by examiner

[Fig.1]
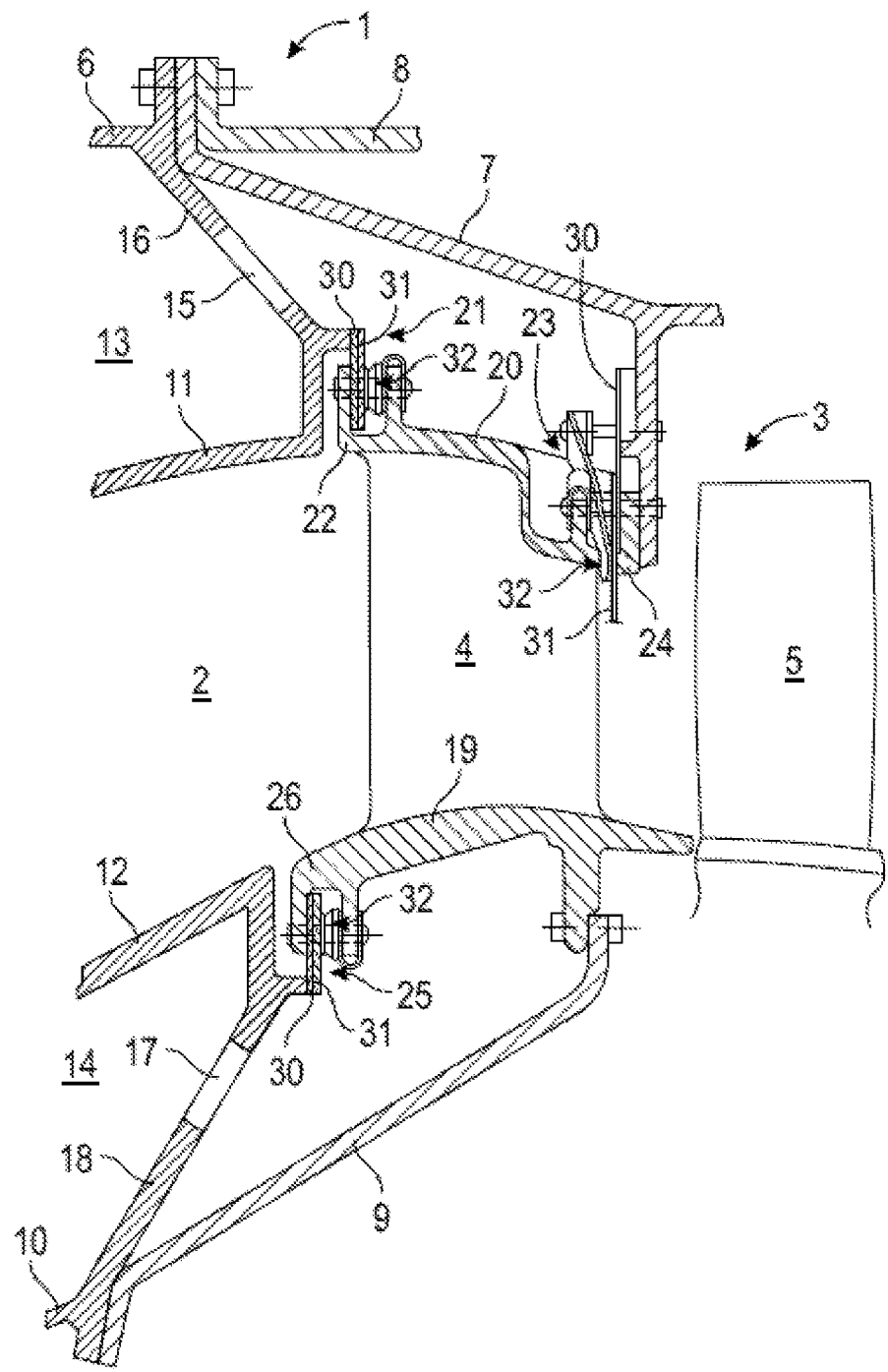

[Fig.2]
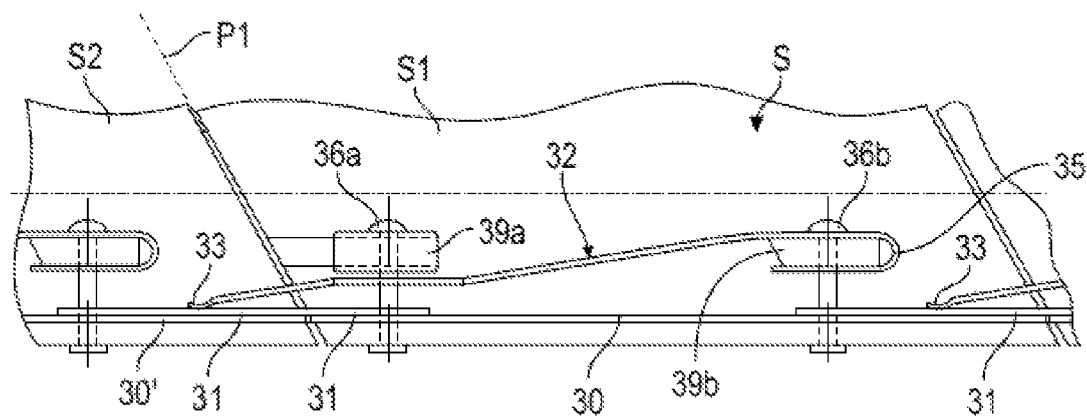
[Fig.3]
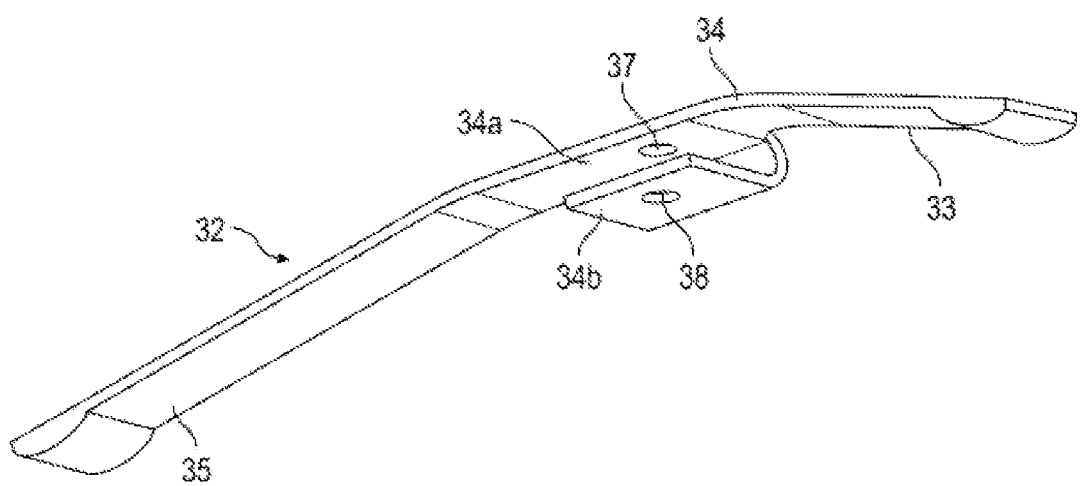

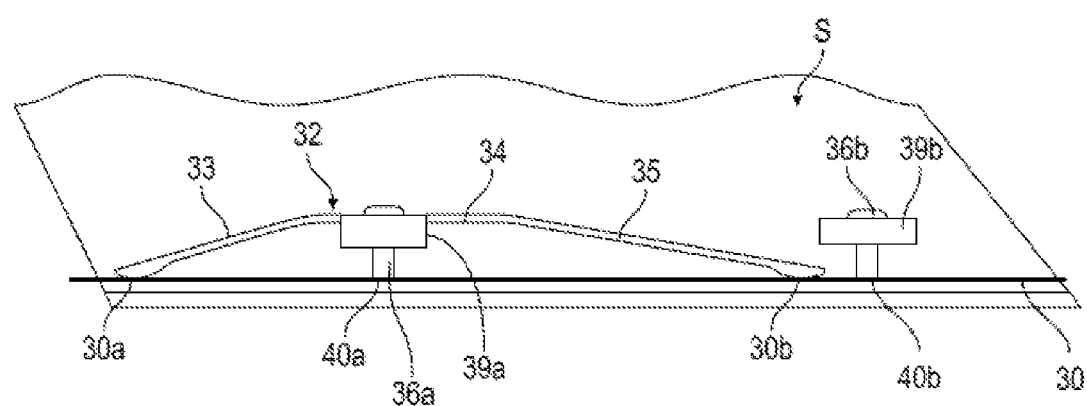
[Fig.4]

TURBOMACHINE MODULE EQUIPPED WITH A HOLDING DEVICE FOR SEALING BLADES

CROSS REFERENCE TO RELATED APPLICATION

This application claims priority under 35 U.S.C. § 119 to French Patent Application No. 1904888, filed May 10, 2019, which is herein incorporated by reference in its entirety.

FIELD

Embodiments of the present disclosure relate to the field of aeronautical turbomachines, e.g., blade sealing systems, in particular for a turbine nozzle of a high-pressure turbine of an aircraft engine.

BACKGROUND

The prior art includes FR-A1-2 786 222 and U.S. Pat. No. 5,118,120.

The blades sealing systems are commonly used in a turbomachine to provide a fluid sealing between internal and external annular enclosures of a combustion chamber, in which cooling air from turbine nozzles and guide vanes flows, and the hot gas duct delivered by the combustion chamber. These blades are arranged in annular spaces separating platform elements of a structural element and are supported, in the sealing position, on generators of these elements.

These blades are subjected to the pressures prevailing on both sides. In general, the pressure of the cooling gases is higher than the pressure of the hot gases and the blades are arranged in such a way that the pressure difference acts favorably on the desired sealing. However, since turbomachines are subject to extremely variable operating conditions, many problems can occur, in particular due to expansion, vibration, and small pressure differences in certain flight phases. For this reason, the sealing systems comprise holding devices to continuously stress and hold the blades in their sealing position.

Some high-pressure turbines consist of a turbine nozzle, the sealing of which is performed by blades and holding devices that are capable of plating the adjacent blades of the turbine nozzle together to prevent leakage between the sectors of the turbine nozzle and the combustion chamber upstream and the external casing downstream.

In this patent application, "upstream" and "downstream" refer to the flow of gases in the turbomachine, and in particular in a turbomachine module.

This type of sealing system is described in FR-A1-2 829 796 and illustrated in FIGS. 1 and 2, which will be detailed below. However, the support on adjacent blades of the sectors may cause offset between these sectors during the operation of the engine and result in an asymmetry of the sealing system. This asymmetry can lead to a pre-tension (which can lead to plasticization) of the holding device during its assembly and also during the operation of the engine. In addition, this sealing system requires several bends in the element forming the holding device, which can be complex to manufacture. The assembly and the operation of this holding device in the turbomachine is also difficult to set up. In fact, the folded portions of the holding device are fixed by several rivets and on several elements making up the turbine nozzle, requiring balancing of the asymmetry of the sealing system. In addition, a plasticization of the holding device and/or an offset between the sectors of the turbine nozzle can cause poor pressing firmly of the blades and cause leakage. All of these anomalies of the sealing system can impact the performance of the engine and cause burns of the blades of the turbine nozzle and aerodynamic disturbances in the duct.

Embodiments of the present disclosure provide a reliable sealing solution, with an improved service life and which ensures a stable holding of the sealing blades in the sectors of the turbine nozzle.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Embodiments of the present disclosure are intended to overcome one or more disadvantages of the prior art by offering a solution that is simple, effective and cost-effective to produce.

Embodiments of the present disclosure provide a turbomachine module, such as for aircraft, having an annular turbine nozzle sectorized and interposed axially between two structural elements, the turbine nozzle comprising several sectors having guide vanes which extend between inner and outer platform elements, at least one of the platform elements of each sector carrying, on the one hand, at least one sealing blade configured to ensure fluid sealing between the platform element and the adjacent structural element, and on the other hand, a device for holding the blade in sealing position, the holding device comprising at least one leaf spring extending circumferentially at the periphery of the platform element and supported on the blade, wherein each leaf spring has a middle portion fixed to a platform element of a sector, and opposite end portions which are supported on the blade carried by this platform element.

The leaf spring advantageously provides a double abutment on a same blade of a same turbine nozzle sector. The holding of the leaf spring by double abutment on the blade makes it possible, on the one hand, to improve the reliability of the pressing of the blade in sealing position and, on the other hand, to better distribute the stress forces on the leaf spring. Contrary to the prior art, the leaf spring of the present disclosure, thanks to its particular shape and dimensions, allows it to dampen and absorb more efficiently the pressures and/or vibrations induced on the sealing system. Thus, the leaf spring of the present disclosure is less prone to plasticization when mounted on the blade and during operation in the turbomachine. The free end portions of the leaf spring are also less susceptible to cracking and breakage. Finally, the sealing system eliminates the need to balance the leaf spring in relation to the blade and the sector and thus also eliminates the asymmetry and the offset that can result between the turbine nozzle sectors.

According to another aspect, a first end portion of each leaf spring is supported on a blade close to a first circumferential end of this blade, and a second end portion of this leaf spring is supported on this blade at a distance from a second circumferential end of this blade.

According to another aspect, the middle portion is closer to the first end portion than to the second end portion of the leaf spring.

According to another aspect, the middle portion has a general C-shape and comprises two walls forming between them a space for receiving a first fastening tab of the platform element.

According to another aspect, the leaf spring is fixed by a rivet passing through the middle portion and the first fastening tab.

This configuration has the advantage of providing a single point of fastening of the leaf spring with the blade on the platform element of the sector of the turbine nozzle. This single fastening allows the leaf spring to have more freedom and flexibility, in order to limit the plasticization of the leaf spring. Another advantage of attaching the leaf spring to the blade according to this configuration is to limit the use of additional fasteners that would clutter up the sealing system.

According to another aspect, the platform element of the sector comprises a second end fastening tab independent of the leaf spring.

According to another aspect, the end portions of each leaf spring are thickened and each comprise a flat surface for support on a blade.

These thickened end portions allow for greater pressing on the two circumferential ends of the blade.

According to another aspect, the blade has a general curved or arch shape.

According to another aspect, each leaf spring extends over a length of between 60% and 80% of the total length of the blade.

These characteristics of the leaf spring makes the double support possible on a single blade of the same turbine nozzle sector. On the contrary, the length of the holding device of the prior art (FIG. 2) corresponds to at least 90% of the total length of the blade so that this device can plate the adjacent blade of the adjacent sector of the turbine nozzle.

According to another aspect, the leaf spring is made of a heat-resistant alloy, for example based on cobalt.

The present disclosure also relates to an aircraft turbomachine comprising at least one module according to one of the embodiments of the present disclosure.

Embodiments of the present disclosure may comprise any one or more of the foregoing characteristics, taken in isolation from one another or in combination with one anothers.

DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein:

FIG. 1 is a partial schematic view in axial section of a module of a turbomachine equipped with a device for holding sealing blades;

FIG. 2 is a schematic partial and top view of a device for holding adjacent sealing blades;

FIG. 3 is a schematic perspective view of a leaf spring of a holding device, according to an embodiment of the present disclosure; and FIG. 4 is a partial schematic front view of the holding device of FIG. 3 in its mounting environment.

DETAILED DESCRIPTION

FIG. 1 shows a partial illustration of a module of a turbomachine 1, such as an aircraft turboshaft engine, extending along a longitudinal axis X and comprising a combustion chamber 2, and a high-pressure turbine 3 consisting of one or more stages. Each stage of the turbine comprises a row of guide vanes 4 and a row of moving vanes 5 arranged alternately in a known manner.

The high-pressure turbine is supported by a structure comprising, on the radially outer side, an outer casing 6 of the combustion chamber, a turbine outer ring 7 and a turbine casing 8 connected together by bolts. On the radially inner side of the turbine 3, an inner casing 9 of the turbine is connected to an inner casing 10 of the combustion chamber.

The combustion chamber 2 is annular and bounded by an outer liner 11 and an inner liner 12.

Conventionally, high-pressure cooling air flows around the annular combustion chamber 2, through the outer annular enclosures 13 bounded by the outer casing 6 and the outer liner 11 of the combustion chamber 2 and through the inner annular enclosure 14 bounded by the inner casing 10 and the inner liner 12 of the combustion chamber 2. The cooling air flows downstream through the orifices 15 in the wall 16 connecting the downstream ends of the outer casing 6 and the outer liner 11 of the combustion chamber 2 to cool the guide vanes 4 and through the orifices 17 provided in the wall 18 connecting the downstream ends of the inner casing 10 and the inner liner 12 of the combustion chamber 2 to cool inner platforms 19 of the guide vanes 4.

In a known manner, the row of guide vanes 4 forms a turbine nozzle which is sectorized and formed of monobloc sectors S each comprising several guide vanes 4 connecting an outer platform element 20 and an inner platform element 19. It is necessary to prevent air leakage between the platform elements 19, 20 of the sectors S and the adjacent structural elements.

In the turbomachine module, a sealing system is interposed in the following spaces:

the space 21 between the upstream end 22 of the outer platform elements 20 and the wall 16, the space 23 between the downstream end 24 of the outer platform elements 20 and the outer ring 7 of the turbine, and the space 25 between the upstream end 26 of the inner platform 19 and the wall 18.

According to any embodiment of the present disclosure, a "sealing system" may be defined as comprising at least one blade and a device for holding this blade in a sealing position on at least one platform element of a sector of the turbine nozzle.

FIG. 2 shows the sealing system of the prior art in FR-A1-2 829 796, which comprises blades 30, 30', which may be curved and joined, and a device 32 for holding the blades 30, 30' in a sealing position. Each of the sealing blades 30, 30' is carried by a platform element (outer 20 and/or inner 19) of a turbine nozzle sector S. These blades extend radially outwards for the blades blocking the spaces 21 and 23 and inwards for the blades intended to block the space 25, and comprise a generator supported on the adjacent structural element.

Two adjacent blades 30, 30' of a same sealing system are joined in a plane P1 separating two consecutive sectors S1, S2. As can be seen in FIG. 2, the joint between these two blades 30, 30' is covered by a joint cover 31 interposed between the adjacent ends of these blades and a holding member 33 of the holding device 32 which bias the adjacent blades 30, 30' in sealing position. This holding device 32 therefore comprises the holding member 33, which is a free and rounded end, and a U-shaped bent end 35 and remote from the holding member 33. The holding device 32 is held on a sector S1 by means of two rivets 36a, 36b fixed respectively to fastening tabs 39a, 39b of a platform element 19, 20. The rods of these rivets 36a, 36b pass through corresponding orifices in the holding device 32 (more precisely in the bent end 35 and an intermediate portion of the device 32), the blade 30 and the joint cover 31. This arrangement of the holding device 32 on two adjacent sectors has several disadvantages mentioned in the background, in particular a risk of offset of the sectors of the turbine nozzle.

The sealing system of the present disclosure is also suitable for installation in the turbomachine module 1 illustrated in FIG. 1. The sealing system of the turbomachine module 1 of the present disclosure is illustrated in FIGS. 3 and 4.

FIG. 3 shows a leaf spring 32 of a holding device according to the present disclosure. This leaf spring 32 has a general elongated shape and comprises a first and a second end portions 33, 35 which are free and opposite to each other, as well as a middle portion 34 disposed between these two end portions. The free end of the first portion 33 is closer to the middle portion 34 than is the free end of the second portion 35.

In some embodiments, these different portions 33, 34 and 35 of the leaf spring 32 are formed from a single piece of heat-resistant alloy material, for example based on Cobalt.

In some embodiments, the end portions 33, 35 are thicker than the rest of the leaf spring 32.

In the example shown, the middle portion 34 is bent in a general C- or U-shape to form two parallel walls, upper 34a and lower 34b respectively, bounding a space for receiving between them, for example for a first fastening tab of the platform element. More particularly, the middle portion 34 curved in a U or C shape may comprise a transverse wall connecting these two walls, preferably longitudinal walls 34a, 34b between them. The general U- or C-shape whose open passage is intended to be oriented radially towards the guide vanes row 4, when the leaf spring 32 is assembled in the turbomachine module (FIG. 1). The walls 34a, 34b each comprise an opening 37, 38 opposite each other, for example, for receiving a fixing means.

Advantageously, the leaf spring 32 can have a curved or arch shape and can be made by bending at the middle portion 34 bending the leaf spring in a predetermined manner so that the end portions 33, 35 are elastically deformable. This leaf spring 32 also includes a bore in the middle portion 34 so that this middle portion can be fixed to the platform element. This embodiment of the leaf spring with a single hole and a single bend eliminates stress areas in the middle portion, which is generally subject to plasticization, while improving the operation of damping the operating stresses of the leaf spring.

The leaf spring in FIG. 3 is shown in its environment in FIG. 4. In FIG. 4, the leaf spring is used to maintain a sealing blade 30 carried by a platform element 19, 20 of a turbine nozzle sector S. The leaf spring 32 extends around the periphery of the sector S and is supported only by the blade 30 of one and same sector S, contrary to the prior art. This arrangement is reproduced on the blades 30 of the different sectors S of the turbine nozzle.

The first end portion 33 of the leaf spring is supported on a first circumferential end 30a of the blade 30, and its second end portion 35 is supported on a second circumferential end 30b of the blade 30. Thus, in a manner similar to the prior art, a first support (or plating) on the blade 30 is produced by the first end portion 33, and this support is, on the one hand, close to the middle portion 34, and on the other hand, remote from the second end portion 35 of the leaf spring 32. A second support on the blade 30, not taught in the prior art, is made by the second end portion 35 and this support is, preferably, close to a second orifice 40b of the second circumferential end 30b of the blade 30. This second orifice 40b allows this blade 30 to be fixed to a second fastening tab 39b of the platform element by a rivet 36b. This double support of the leaf spring 32 on the blade 30 makes it possible, on the one hand, to balance the plating in the sealing position of the leaf spring on a same blade 30 of a same sector S of the turbine nozzle, and on the other hand, to ensure a good distribution of the forces on the whole of the leaf spring and thus to suppress its plasticization.

In addition, the leaf spring 32 is fixedly connected to the blade 30 by the middle portion 34 on the platform element of the sector. In fact, the middle portion 34 is fixed through a first orifice 40a of the blade 30 on a first fastening tab 39a of the platform element by means of a rivet 36a. Thus, a single point of attachment of the leaf spring 32 is sufficient to balance the supports of the end portions 33, 35 on either side of this attachment and thus also to limit the plasticization of the leaf spring.

In addition, the length or circumferential dimension of the leaf spring 32 is smaller than that of a blade 30 or a sector S of the turbine nozzle. This dimensioning makes it possible to double-support the leaf spring directly on the blade on which it is mounted. In addition, it should be noted that the spring or damping operation characteristic of the leaf spring can be obtained by specifically sizing a thickness and a length necessary for this leaf to move a certain length according to a given force. For example, and without limitation, a leaf spring with a small thickness and a longer length can reduce the stiffness and therefore increase the damping of this leaf.

Furthermore, this new configuration and assembly of the holding device on the blade can be easily adapted to existing turbine nozzles without modifying the structure or layout of the turbine nozzle or the adjacent parts.

Thus, the blade sealing system equipped in the turbomachine module of this disclosure is advantageous compared to the prior art for at least several reasons:
- it reinforces the sealing on the blade by a double support of the holding device;
- it eliminates the plasticization of the leaf spring of the holding device;
- it eliminates the asymmetry and the balancing of the sealing system;
- it eliminates the offset of the sectors of the turbine nozzle;
- it simplifies the manufacture (by a bending and a drilling) of the leaf spring of the holding device;
- it adapts to existing turbine nozzles.

In general, the holding device with double support on a same sealing blade improves the performance of the engine and limits the aerodynamic disturbances in the duct of the turbomachine. The proposed solutions are simple, effective and cost-effective to produce and assemble on a turbomachine, while ensuring a reliable and an improved service life sealing between the turbine nozzles and the combustion chamber of the turbomachine.

The detailed description set forth above in connection with the appended drawings, where like numerals reference like elements, are intended as a description of various embodiments of the present disclosure and are not intended to represent the only embodiments. Each embodiment described in this disclosure is provided as an example or illustration and should not be construed as preferred or advantageous over other embodiments. The illustrative examples provided herein are not intended to be exhaustive or to limit the disclosure to the precise forms disclosed.

Similarly, any steps described herein may be interchangeable with other steps, or combinations of steps, in order to achieve the same or substantially similar result. Generally, the embodiments disclosed herein are non-limiting, and the inventors contemplate that other embodiments within the scope of this disclosure may include structures and functionalities from more than one specific embodiment shown in the FIGURES and described in the specification. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed. For example, the present disclosure includes additional embodiments having combinations of any one or more features described above with respect to the representative embodiments.

In the foregoing description, specific details are set forth to provide a thorough understanding of exemplary embodiments of the present disclosure. It will be apparent to one skilled in the art, however, that the embodiments disclosed herein may be practiced without embodying all the specific details. In some instances, well-known process steps have not been described in detail in order not to unnecessarily obscure various aspects of the present disclosure.

The present application may include references to directions, such as "first," "second," "vertical," "horizontal," "front," "rear," "left," "right," "top," and "bottom," etc. These references, and other similar references in the present application, are intended to assist in helping describe and understand the particular embodiment (such as when the embodiment is positioned for use) and are not intended to limit the present disclosure to these directions or locations.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The term "about," "approximately," etc., means plus or minus 5% of the stated value. The term "based upon" means "based at least partially upon."

The embodiments of the invention in which an exclusive property or privilege is claimed are defined as follows:

1. A turbomachine module, comprising:
   an annular turbine nozzle sectorized and interposed axially between two structural elements, the annular turbine nozzle comprising several sectors (S),
   each sector (S) having a guide vane extending between an inner platform element and an outer platform element, at least one of the inner or outer platform elements carrying:
      at least one sealing blade configured to ensure fluid sealing between at least one of the inner or outer platform elements and an adjacent structural element of the two structural elements, and
      a holding device of the at least one sealing blade in a sealing position, the holding device comprising a leaf spring extending circumferentially at a periphery of the at least one of the inner or outer platform elements, the leaf spring being supported on the at least one sealing blade,
   wherein the leaf spring comprises a middle portion fixed to the at least one of the inner or outer platform elements, and opposite first and second end portions which are supported on the at least one sealing blade carried by said at least one of the inner or outer platform elements.

2. The turbomachine module according to claim 1, wherein the first end portion of the leaf spring is supported at a first distance from a first circumferential end of the at least one sealing blade, and the second end portion of the leaf spring is supported at a second distance from a second circumferential end of the at least one sealing blade, the second distance being greater than the first distance.

3. The turbomachine module according to claim 1, wherein the middle portion is closer to the first end portion than to the second end portion of the leaf spring.

4. The turbomachine module according to claim 1, wherein the middle portion has a C-shape and comprises two walls forming between them a space configured to receive a first fastening tab of the at least one of the inner or outer platform elements.

5. The turbomachine module according to claim 4, wherein the leaf spring is fixed by a rivet passing through the middle portion and the first fastening tab.

6. The turbomachine module according to claim 4, wherein the at least one of the inner or outer platform elements comprises a second end fastening tab independent of the leaf spring.

7. The turbomachine module according to claim 1, wherein the opposite first and second end portions of the leaf spring have a first thickness greater than a second thickness of the middle portion of the leaf spring, and each of the first and second end portions comprises a flat surface configured to be supported on the at least one sealing blade.

8. The turbomachine module according to claim 1, wherein the at least one sealing blade has a curved shape.

9. The turbomachine module according to claim 1, wherein the leaf spring extends over between 60% and 80% of a total length of the at least one sealing blade.

10. The turbomachine module according to claim 1, wherein the leaf spring is made of a heat-resistant alloy.

11. An aircraft turbomachine, comprising at least one module according to claim 1.

12. The turbomachine module according to claim 1, wherein the leaf spring is a single piece.

13. The turbomachine module according to claim 10, wherein the leaf spring is at least partially made of a Cobalt alloy.

14. The turbomachine module according to claim 4, wherein the middle portion includes a bore configured to be fixed to the at least one of the inner and outer platform elements by a rivet passing through said bore.

15. The turbomachine module according to claim 4, wherein said two walls form, respectively, an upper wall and a lower wall, wherein the upper wall comprises a first opening and the lower wall comprises a second opening.

16. The turbomachine module according to claim 15, wherein said first opening and second opening are opposite each other.

17. The turbomachine module according to claim 1, wherein the turbomachine module comprises a portion of a high pressure module comprising a row of several of said guide vanes and a row of moving vanes.

* * * * *